UNITED STATES PATENT OFFICE.

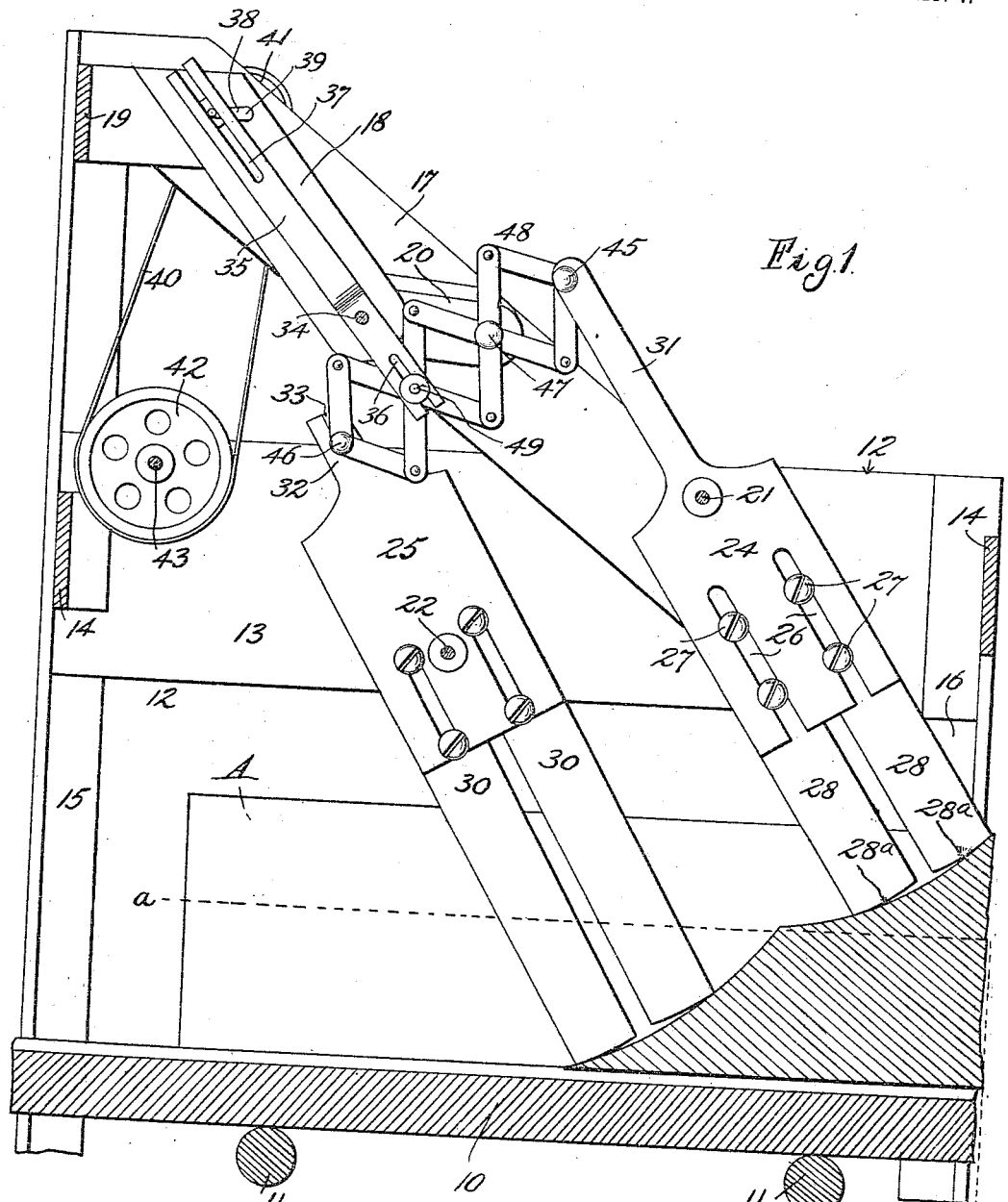

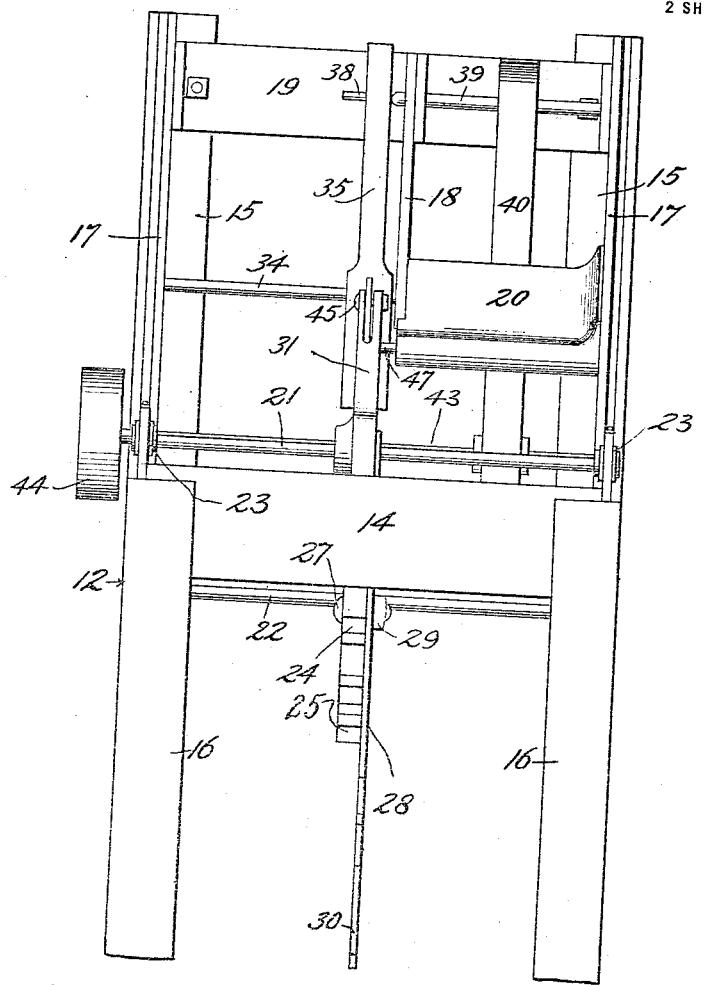
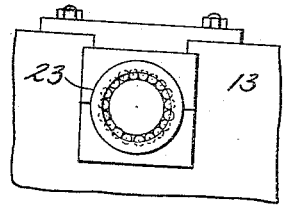
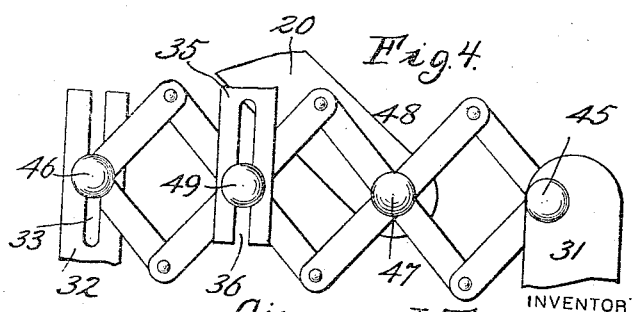

GIUSEPPE L. TIMPANO, OF NORTHFIELD, VERMONT.

STONE-SAWING MACHINE.

1,266,350.  Specification of Letters Patent.  Patented May 14, 1918.

Application filed December 11, 1916. Serial No. 136,260.

*To all whom it may concern:*

Be it known that I, GIUSEPPE L. TIMPANO, a citizen of the United States, residing at Northfield, in the county of Washington and State of Vermont, have invented certain new and useful Improvements in Stone-Sawing Machines, of which the following is a specification.

This invention relates to stone working machines and particularly to a machine for sawing stone, and has for its object to provide such a machine which shall be simple in construction, strong, and capable of accurately and rapidly dividing or sawing slabs from large blocks of stone.

Another object of the invention is to provide a stone sawing machine having few parts and provided with a plurality of cutting elements which act on the stone simultaneously in the line of the cut, but at different points in the height of the stone and in the length thereof, the combined action of said cutting elements serving to divide the stone from top to bottom and making such division with great accuracy and with relatively great rapidity.

A further object of the invention is to provide a stone sawing machine in which the cutting elements are formed of metal plates mounted in cutter heads that vibrate about a plurality of axes, the cutter heads being connected to and actuated by a system of connected levers from a source of power and so arranged as to conserve the power and cause each cutting element to operate through a small arc, the combined movement of all the elements being sufficient to completely divide the stone.

Further objects of the invention not hereinafter recited will be described in the following specification, pointed out in the claims, and illustrated in the accompanying drawings, in which—

Figure 1 is a vertical longitudinal section through the improved stone sawing machine, Fig. 2 is an end elevation of the same, Fig. 3 is a detail view of a portion of the frame showing one of the shaft bearings, and Fig. 4 is a detail view of the system of levers for operating the cutting elements.

In the drawings, 10 indicates a horizontal table or bed longitudinally movable by any desired means on rollers or other supports, said bed or table being provided for the support of a block of stone A that is to be cut or sawed through from top to bottom and from end to end.

Above the table or bed 10 is a strong rectangular frame 12 formed of side plates 13 and end plate 14 rigidly connected together and mounted upon vertical legs or supports 15 and 16 connected to the frame 12 at the corners thereof, the legs or supports 15 extending above the frame 12 to such height as it is desired or may be necessary. A brace bar 17 extends from the top of each support 15 downwardly at an angle and is attached to the sides 13 of the frame 12. A second angular bar 18 intermediate the side brace bars 17 is connected at the upper end to a cross bar 19 joining the tops of the two supports 15, said bar 18 terminating above the frame 12, its lower end being connected to a bearing block 20 that projects inwardly from one of the diagonal braces 17.

Extending across the frame 12 are two horizontal shafts 21 and 22, said shafts being supported in the side bars 13 of the frame on anti-friction bearings 23, such as are shown in Fig. 3, the shaft 21 being near the top of the frame 12 while the shaft 22 is near the bottom thereof. These two shafts besides being placed in different horizontal planes are also as clearly shown in Fig. 1 arranged in different vertical planes and on each shaft is fixed a cutter head in the form of plates 24 and 25, the former being mounted on the shaft 21 and the latter on the shaft 22. The cutter head 24 extends downwardly and at an angle to and about the plane of the bottom of the frame 12 and is provided with two slots 26 parallel to each other and extending upwardly from the lower end of the head to a point a short distance from the shaft 21. Through these slots 26 pass screws or bolts 27 which also pass through holes in thin steel plates 28.

Nuts 29 on the ends of the bolts 27 secure the steel plates 28 to the cutter head, the longitudinal position of which plates relatively to the cutter head being adjusted by movement of the bolts in the slots 26. The plates 28 serve as cutters for dividing the stone A and are therefore made of thin material arranged parallel to each other with their edges in the plane of oscillation of the cutter head 24. The cutter head oscillates about the axis of the shaft 21 and the lower ends 28ª of the plates 28 engaging the block of stone A will cut a kerf therein throughout the length of the stone and through a portion of its height, in the present instance the cutter operating from the top of the block A downwardly as far as the horizontal dotted line $a$. The remainder of the stone between the line $a$ and the bottom thereof is divided by means of cutters 30 mounted on the cutter head 25 and similar in all respects to the cutter 28 but longer. These cutters are secured to the cutter head 25 in a similar manner to the cutters 28 and are adjustable, like them, to vary their length and positions with relation to the block to be cut and the carriage 10.

The shaft 21 passes through the top of the cutter head 24 and to operate said cutter head an arm 31 extends upwardly in the plane of the cutter head and in line therewith to a suitable height for connection with means whereby the cutter head may be vibrated. The cutter head 25 which is pivoted near the bottom of the frame 12 has its upper end near the top of the frame 12 and from said end there projects a short arm 32 in which is formed a longitudinal slot 33 as shown.

A shaft 34 extends horizontally across the machine above the frame 12 and has a bearing at one end in the block 20, and at its opposite end in the diagonal brace 17 on that side. Mounted on this shaft is a lever 35, its lower end being longitudinally slotted at 36 and its upper end similarly slotted as shown at 37. A crank 38 on a shaft 39 engages the slot 37 and as said shaft rotates, the lever 35 is caused to vibrate on the shaft 34. The shaft 39 is driven by a belt 40 passing over a pulley 41 on the shaft 39 and a pulley 42 on a driving shaft 43 mounted in the frame 12 and provided on one end with a pulley 44 or other rotatable means.

Between the arms 31 and 32 of the cutter head there extends a plurality of connected levers 48 similar to a lazy tongs, one end of the lazy tongs being pivoted as at 45 to the arm 31, and by a pin 46 the opposite end of the lazy tongs engages the slot 33 in the arm 32. At one of the crossings of two of the levers of the lazy tongs 48, there is a pivot pin 47 connecting the lazy tongs with the bearing block 20, while at another crossing is a second pin 49 that engages the slot 36 in the lower end of the lever 35. As thus constructed rotation of the shaft 39 through its crank 38 vibrates the lever 35, while the latter engaging the pin 39 of the lazy tongs alternately expands and contracts the latter and thereby imparts vibratory movement to the cutter heads 24 and 25 and to their cutters 28 and 30.

The operation of the machine as thus described is self evident, it being only necessary to say further that the carriage or table 10 advances slowly toward the cutters as they operate to divide the block of stone $a$, and because of the fact that each cutter head has but slight movement, it may run with relatively great rapidity and therefore cut the stone more rapidly. A plurality of cutters being provided, each cutting through a certain portion of the vertical dimension of the stone and all operating at the same time, it is clear that great speed may be attained in cutting the stone. While but two cutter heads have been shown, it is clear that a greater number may be employed if found necessary so that the machine may be capable of operating on blocks of stone of great length and width. It is also clear that the supports 15 may be rigidly secured to a base, or carried by any suitable devices that will enable the frame 12 to be raised and lowered to accommodate the cutters to the stones to be cut.

What is claimed is:

1. A stone sawing machine comprising a plurality of individual vibratory cutting members alined to simultaneously cut in the same vertical plane at different heights, a system of compound levers connecting said members for swinging the same in opposite directions at different speeds, and means for operating said levers.

2. A stone sawing machine comprising a pair of individual vibratory cutting members alined to simultaneously cut in the same vertical plane and at different heights, a system of interconnected crossed levers forming a lazy tongs pivoted at its ends to said cutting members for simultaneously vibrating them in opposite directions, and means connected to said lever system between the ends for vibrating the cutting members.

3. A stone sawing machine comprising a pair of individual vibratory cutting members alined to swing in the plane of the cut and at different elevations, a lazy tongs connection between said cutting members for simultaneously swinging them in opposite directions and at different speeds, and means for actuating said lazy tongs connection.

4. A stone sawing machine comprising a pair of cutters adapted to be vibrated in the same vertical plane and operated at different elevations, a lazy tongs connected at its ends to said cutters, said lazy tongs being pivoted at a point unequally distant from the ends on a fixed support to cause one of said cutters to swing at greater speed and through a larger arc than the other, and means for operating said lazy tongs to swing said cutters simultaneously in opposite directions.

In testimony whereof I affix my signature in presence of two witnesses.

GIUSEPPE L. TIMPANO.

Witnesses:
LAURA M. AVERILL,
FRANK PLUMLEY.